Sheet 1. 2 Sheets.
F. P. Dimpfel,
Reciprocating Steam Engine,
No. 1,877, Reissued Feb. 21, 1865.
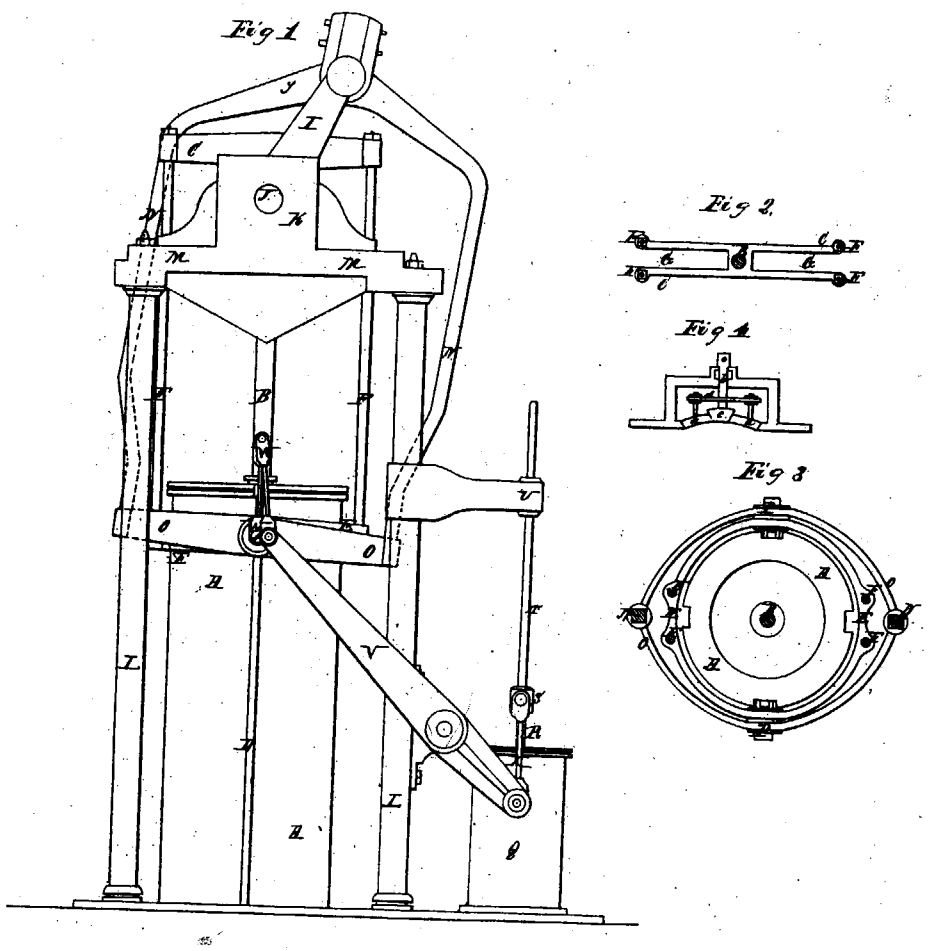

Sheet 2-2 Sheets.
F. P. Dimpfel,
Reciprocating Steam Engine,
No. 1,877, Reissued Feb. 21, 1865.
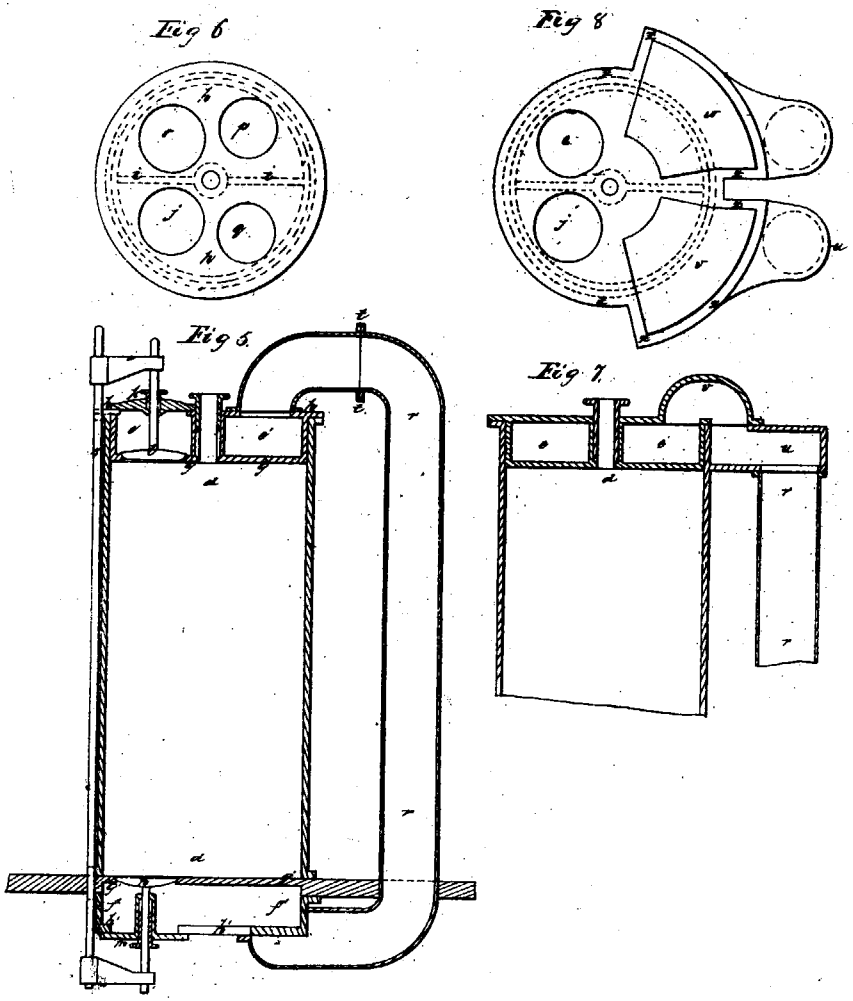

UNITED STATES PATENT OFFICE.

FREDERICK P. DIMPFEL, OF NEW YORK, N. Y.

IMPROVEMENT IN STEAM-ENGINES.

Specification forming part of Letters Patent No. 8,201, dated July 1, 1851; Reissue No. 1,877, dated February 21, 1865.

*To all whom it may concern:*

Be it known that I, FREDERICK P. DIMPFEL, of the city of New York, in the State of New York, have invented certain new and useful Improvements in the Steam-Engine, and more particularly in the manner of connecting the steam-piston with the crank, so as to render the whole apparatus more compact, and to obtain a longer stroke of the engine in a given space than has hitherto been obtained; and I do hereby declare that the following is a full, clear, and exact description thereof, reference being had to the accompanying drawings.

Figure 1 represents such parts of a steam-engine as are deemed necessary to elucidate the nature of my improvements thereon.

This engine is represented as standing vertically, although its position may be altered without changing the nature of my improvements; but this vertical position is to be preferred where there are not any serious obstacles in the way of adopting it.

A A represent the steam-cylinder, B the piston-rod, and C the cross-head, a top view of which latter is shown in Fig. 2.

D is a slide upon the cylinder, there being another on its opposite side.

Fig. 3 is a top view of the cylinder, and of two metallic rings or belts which surround it, and which are to play up and down with the piston, one of these rings E E being attached to the cross-head by the side rods, F F, of which there are four, the cross-head being bifurcated or divided into two parts at each of its ends, as shown at G G, Fig. 2, the sides of the connecting-rod N N, to be presently described, passing alternately into the spaces G G in the cross-head as the crank revolves and the piston reciprocates.

D′ D′ are guide-blocks attached to and making a part of the vibrating ring E E, and which embrace the slides D D, and thus serve to cause the cross-head and piston to move vertically. Should it be found necessary, a parallel motion may be attached to one of the ends of the cross-head to make it work steadily.

Under the foregoing arrangement the cross-head is made to stand at right angles to the crank-shaft, this being necessary in order to allow it to pass up between the cranks and to effect the saving of room consequent thereon.

I is the crank, standing immediately over the cylinder; J, one end of its shaft; and K, one of the pillow-blocks supporting the ends of shaft J.

L L are columns which support the cap-pieces M and the pillow-blocks K. There are four columns, L, two on each side of the cylinder.

N N is the connecting-rod, which, instead of consisting of a single bar, is forked in the manner represented in the drawings, its stub end embracing the crank, its cross-piece *y* standing transversely to the crank-shaft, and its two bars N N extending downward on opposite sides of the cylinder. This connecting-rod will at its upper end vibrate from side to side to a distance equal to the throw of the crank, and it is to admit of this vibration that the ends of the cross-head C are bifurcated, the bars N N passing alternately into the spaces G G. The lower ends of the bars N N of the connecting-rod are attached to a ring or belt, O O, which surrounds the ring or belt E. These two rings are connected together by joint-pins at P P in the manner of gimbals.

The cylinder Q represents that of an air-pump, the piston and piston-rod R of which may be carried by a cross-head, S, the rod T being a slide-rod passing through a socket, U, there being a similar slide-rod and socket on the opposite side of the piston-rod R.

V is a vibrating lever, connected by link-rods W to the vibrating rings or belts E O, and by link-rods X to the air-pump cross-head S. The air-pump, when one is used, may be otherwise arranged, my improvements not depending upon the particular manner of combining this with the other parts of the engine.

I have contemplated the forming of the lower part of one of the columns L into a condenser, and another into a hot-well, which can be readily effected by any competent machinist, should such an arrangement be deemed eligible.

Under the foregoing arrangement it will be seen that as the crank-shaft is made to revolve the rings or belts E and O will be moved up and down on the outside of the cylinder, being guided by the slides D D.

In Fig. 4 of the accompanying drawings I have represented an improved puppet-valve, such as is attached to my steam-engine, the object of which improvement is to cause it to offer less resistance in opening under the pressure of steam than that to which it is ordinarily subjected. In this figure, *a a* is a puppet-valve resting on its seat. *b* is the valve-stem, and *c* a small valve, of which the larger valve, *a a*, constitutes the seat. When the stem *b* is raised, the valve *c* will be lifted, and this may have a play of half an inch, more or less, before it comes into contact with the bar or cross-piece *d*, attached to the main value, which it will then lift. The raising of the small valve *c* will allow steam to pass through its seat and under the main valve *a a*, which will consequently be lifted with facility.

In the accompanying drawings I have also shown an improved manner of arranging and combining the steam-pipes, steam-chests, and valves. It is as follows:

Fig. 5 is a sectional representation of a steam-cylinder, having at its upper and lower ends cylinder-heads of a peculiar construction, each of them being so formed as to constitute two chambers, one of which is an induction and the other an eduction chamber.

*d d* is the cylinder, and *e e′ f f′* are steam-chambers, formed in the cylinder-heads, each of which heads consists of a double plate, *g g′* and *h h′*. In each of these heads there is a partition, which divides the space between the two plates into two semicircular chambers.

Fig. 6 is a top view of the upper head, the partition which divides the space between *h h* and *g g* into two chambers being shown by the dotted lines *i i*.

*j* is an opening, which in Fig. 5 is shown as covered by a cap, *k*, having in it a stuffing-box for the passage of the stem of the valve *l*, which valve has its seat in the plate *g* and opens upward. *m* is a plate on the lower head similar to that marked *k* in the upper; and *n* is a valve in the plate *g′*, also furnished with a stuffing-box and opening upward.

The opening *o* in the plate *h*, Fig. 6, is similar to the opening *j* in its office—that is to say, it is situated directly above two valves in the respective plates *g* and *g′*, but operating in a direction the reverse of that of the valves *l* and *n*—*i. e.*, the uppermost valve opening downward and the lowermost valve opening upward. The openings *p* and *q* in the plate *h h* are for the reception of the induction and eduction pipes, one of which is shown at *r r*, Fig. 5, and the other (not shown) being similar thereto. The induction and eduction pipes cross each other below the lower head, as they have to connect with the reverse chambers in the upper and lower heads. The valve-lifter *s*, Fig. 5, rises to admit the steam into the cylinder, supposing the space *e* to be operating as an induction-chamber. The valves in the opposite chambers, which are supposed to be under the opening *o*, will on the contrary have the rod corresponding with *s* to move in the reverse direction to effect the same purpose.

In the arrangement of the upper head, as shown in Fig. 5, said head cannot be removed so as to get at the piston without disconnecting the steam and eduction pipes at the point where they are joined by flanges *t t*, which is attended with considerable inconvenience; but this may be obviated by the particular manner of constructing and putting on the upper head, as represented in Figs. 7 and 8. The general arrangement of the chambers, valves, induction, and eduction pipes is the same as that above described and represented in Figs. 5 and 6.

In Fig. 7, *d* is a sectional view of a part of the cylinder, *e e′* the steam-chambers, and *r r* a steam-pipe. This steam-pipe enters a small chamber or nozzle, *u*, two of which are cast onto the cylinder, as indicated by the letters *u u* in Fig. 8. This last figure represents the top plate of the head, corresponding with *h h* in Fig. 6.

*v* and *w* are two arched spaces, which constitute steamways, leading from the induction and eduction pipes into the respective chambers. By passing screw-bolts through the flanges *x x* around this head-plate and through flanges cast on the cylinder in the ordinary way said plate may be secured in place, and it may be removed with the same facility as the heads of other cylinders.

By this arrangement of the heads and other parts there is a great saving effected in the steam admitted at any stroke of the piston, such saving being equal to one-fifth, or nearly so, when this improved mode of arrangement is compared with that which is usually adopted. The steam contained in the steam-nozzles or passages leading from the valve-seats to the head of the cylinder, as formed in the ordinary engines, is by this arrangement entirely saved. The valves in the plates *g g* and *g′ g′* are flush, or nearly so, when closed with the internal faces of those plates or heads.

It will be manifest that slide-valves might be substituted for the puppet-valves herein spoken of, while the general arrangement of the parts upon which the improvement is mainly dependent might remain unchanged.

It is evident that the construction and arrangement of the valves and valve-chambers above described will not affect the method I have described of connecting the steam piston and crank, and that this method may be used in connection with valves and valve-chambers differing in construction and arrangement from those described in this specification.

In the foregoing description I have stated that the cross-head of the steam-piston is forked at its opposite extremities to allow the bars of the forked connecting-rod to play through it. It is evident that the same result will be obtained if the cross-head is made single and the side bars of the connecting-rod are forked to embrace its opposite extremities, this arrangement being in fact the converse of the one I have described.

What I claim as new, and desire to secure by Letters Patent, is—

1. The means herein described for connecting the steam-piston of a steam-engine with the crank thereof, said means consisting of a piston-rod, fixed cross-head, side bars, forked connecting-rod, and belts, or the equivalents thereof, the several devices being arranged and operating substantially as herein set forth in such manner that the cross piece of the connecting-rod, which is placed transversely to the crank-shaft, shall be on opposite sides of the axial line of said shaft at opposite extremities of the stroke of the piston.

2. The forming of the eduction and induction chambers on cylinder-heads of steam-engines, and furnishing them, respectively, with supply and exhaust-valves, substantially in the manner and for the purposes described.

3. The forming of two steam-chambers in one or both heads of a steam-engine cylinder, in combination with induction and eduction steam-pipes, and with puppet or other valves, in such manner as that a large portion of the steam shall be saved which is lost or wasted in the nozzles or steam-ways of engines as ordinarily constructed, substantially as described.

4. The removable chambered cylinder-head, in combination with the extension-chambers *u u* and steam-pipes *r r*, connected to the latter, substantially as and for the purposes described.

5. The manner, substantially as described, of applying the induction and eduction valves, with their respective chambers, to steam-cylinders, for the purpose set forth.

F. P. DIMPFEL.

Witnesses:
R. T. CAMPBELL,
EZRA MILLER.